US012363605B2

(12) United States Patent
Wang et al.

(10) Patent No.: US 12,363,605 B2
(45) Date of Patent: Jul. 15, 2025

(54) HIGH PRIORITY ROUTE SELECTION DESCRIPTOR (RSD) SELECTION TIMER

(71) Applicant: QUALCOMM Incorporated, San Diego, CA (US)

(72) Inventors: Ying Wang, Beijing (CN); Li Tan, Beijing (CN); Chaofeng Hui, Beijing (CN); Tom Chin, San Diego, CA (US); Shailesh Maheshwari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 18/000,230

(22) PCT Filed: Jul. 8, 2021

(86) PCT No.: PCT/CN2021/105157
§ 371 (c)(1),
(2) Date: Nov. 29, 2022

(87) PCT Pub. No.: WO2022/012403
PCT Pub. Date: Jan. 20, 2022

(65) Prior Publication Data
US 2023/0199608 A1    Jun. 22, 2023

(30) Foreign Application Priority Data

Jul. 14, 2020 (WO) ................ PCT/CN2020/101812

(51) Int. Cl.
*H04W 40/02* (2009.01)
*H04L 67/141* (2022.01)
*H04L 67/143* (2022.01)

(52) U.S. Cl.
CPC .......... *H04W 40/02* (2013.01); *H04L 67/141* (2013.01); *H04L 67/143* (2013.01)

(58) Field of Classification Search
None
See application file for complete search history.

(56) References Cited

U.S. PATENT DOCUMENTS

| 11,356,893 B2 * | 6/2022 | Youn .................. H04W 76/38 |
| 2015/0256961 A1 * | 9/2015 | Kim .................... H04W 4/70 |
| | | 370/329 |

(Continued)

FOREIGN PATENT DOCUMENTS

| CN | 110800330 A | 2/2020 |
| CN | 111406425 A | 7/2020 |

(Continued)

OTHER PUBLICATIONS

Qualcomm Incorporated: "URSP Updates and Application to PDU Session Association Re-evaluation", 3GPP TSG-SA WG2 Meeting #128, S2-187077 WAS 6643 TS23503 URSP Updates and Association Re-evaluation R1, 3rd Generation Partnership Project, Mobile Competence Centre, 650, Route Des Lucioles, F-06921 Sophia-Antipolis, vol. SA WG2, No. Vilnius, Lithuania, Jul. 2, 2018-Jul. 6, 2018, Jul. 6, 2018, 4 Pages, XP051470368, the whole document.

(Continued)

*Primary Examiner* — Robert M Morlan
(74) *Attorney, Agent, or Firm* — Arun Swain

(57) ABSTRACT

This disclosure provides systems, methods and apparatuses for a high priority route selection descriptor (RSD) selection timer. A protocol data unit (PDU) session may be established for an application associated with a user equipment (UE). If the PDU session is associated with a lower RSD priority than the highest RSD priority for the application, the UE may initiate an RSD selection timer. After expiration of the RSD selection timer, the UE may try to establish another PDU session for the application with the highest RSD priority for the application. If another PDU session with the highest RSD priority is accepted, the UE may release the (Continued)

initial PDU session with the lower RSD priority and establish a new PDU session with the highest RSD priority. Such implementations may increase data rates, quality of service, and reliability for the application, decrease latency of the application, or decrease power consumption of the UE.

30 Claims, 5 Drawing Sheets

(56) References Cited

U.S. PATENT DOCUMENTS

| | | |
|---|---|---|
| 2019/0306752 A1 | 10/2019 | Lai |
| 2019/0394745 A1 | 12/2019 | Yu |
| 2020/0053622 A1 | 2/2020 | Huang-Fu et al. |
| 2020/0120487 A1 | 4/2020 | Tang |
| 2021/0227455 A1* | 7/2021 | Aramoto ........... H04W 28/0289 |

FOREIGN PATENT DOCUMENTS

| | | |
|---|---|---|
| WO | 2019127038 A1 | 7/2019 |
| WO | 2019153766 A1 | 8/2019 |
| WO | 2019190166 A1 | 10/2019 |

OTHER PUBLICATIONS

Supplementary European Search Report—EP21843174—Search Authority—The Hague—Jun. 11, 2024.
International Search Report and Written Opinion—PCT/CN2020/101812—ISA/EPO—Apr. 6, 2021.
International Search Report and Written Opinion—PCT/CN2021/105157—ISA/EPO—Sep. 28, 2021.
Oppo, et al., "Clarification on UE Policy Configuration", 3GPP Draft, 3GPP TSG-SA WG2 Meeting #127bis, S2-185954 (was4914), Newport Beach, Califonia, U.S.A, May 28-Jun. 1, 2018, 8 Pages.

* cited by examiner

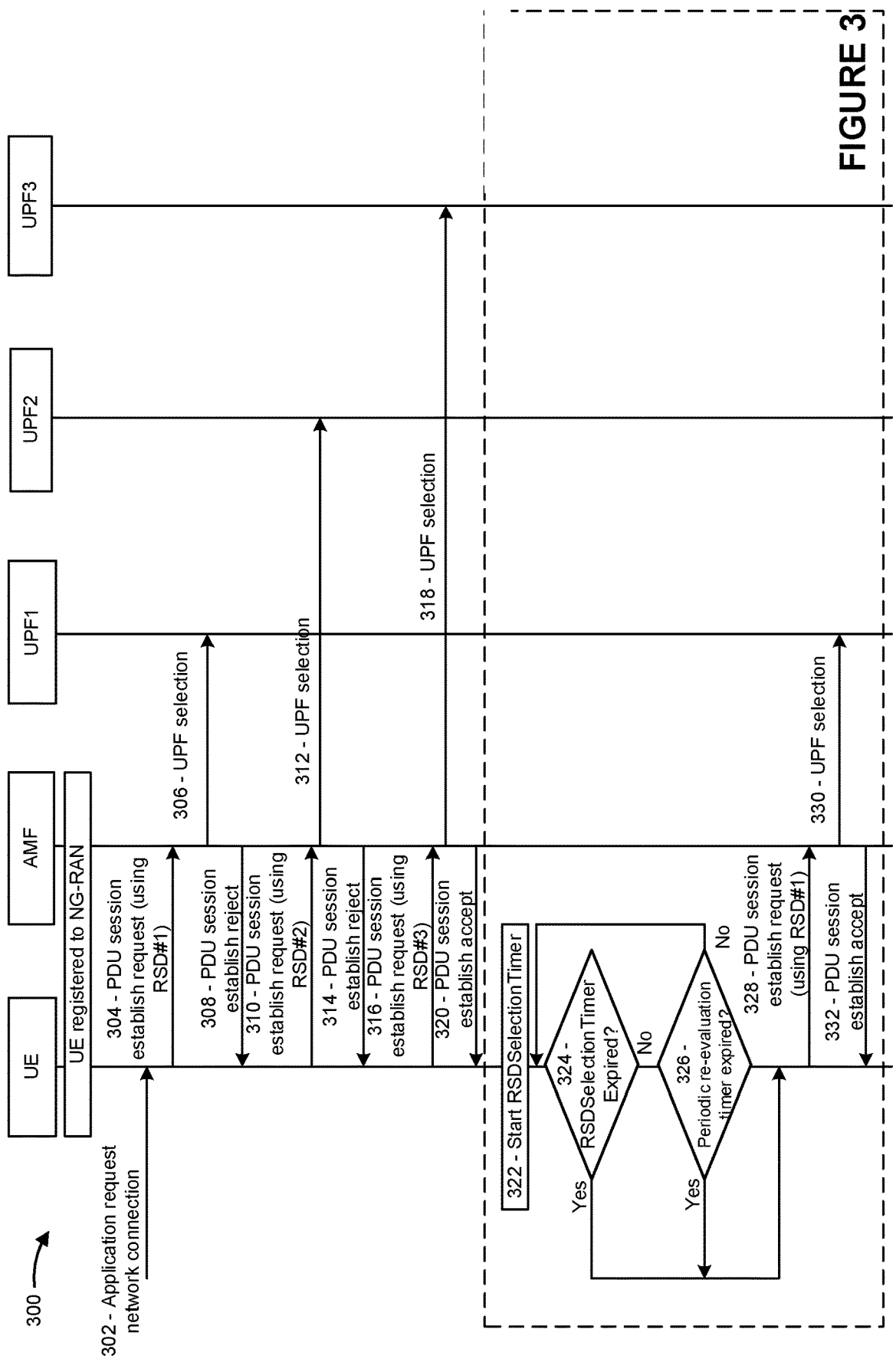

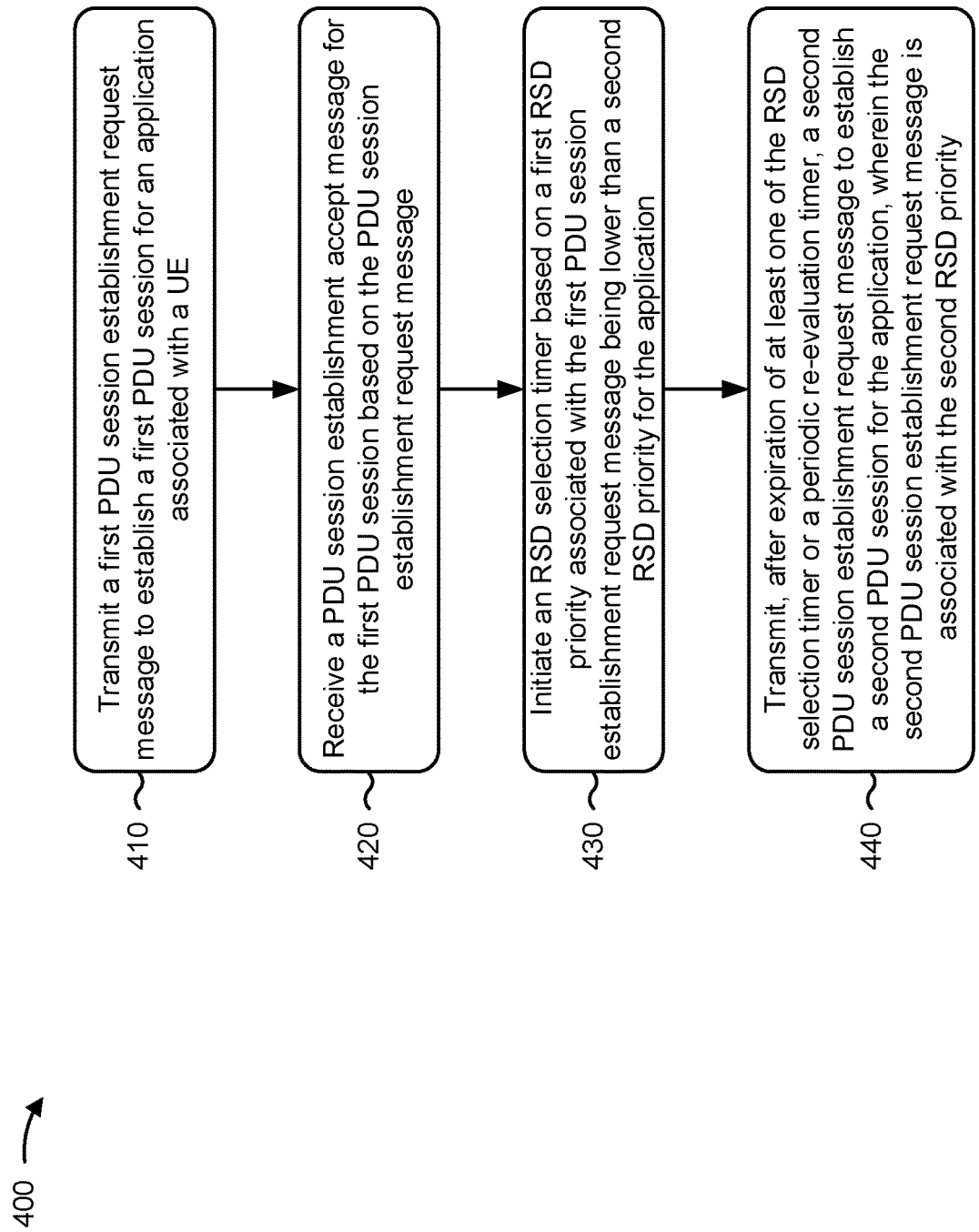

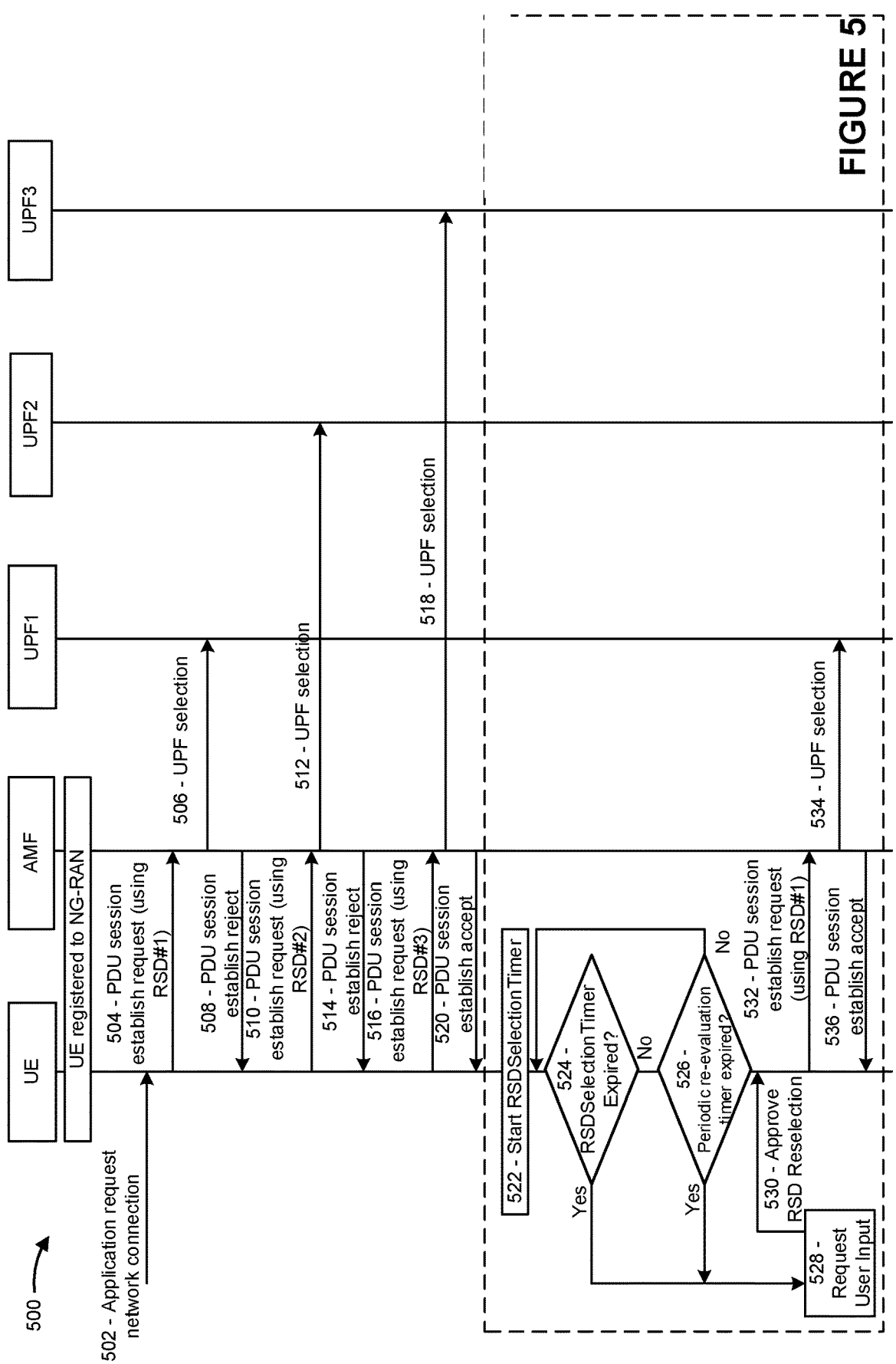

HIGH PRIORITY ROUTE SELECTION DESCRIPTOR (RSD) SELECTION TIMER

CROSS-REFERENCE TO RELATED APPLICATIONS

This Patent Application is a 371 national stage of PCT Application No. PCT/CN2021/105157 filed on Jul. 8, 2021, entitled "HIGH PRIORITY ROUTE SELECTION DESCRIPTOR (RSD) SELECTION TIMER," which claims priority to International Patent Application No. PCT/CN2020/101812, filed on Jul. 14, 2020, entitled "HIGH PRIORITY ROUTE SELECTION DESCRIPTOR (RSD) SELECTION TIMER". The disclosure of the prior Applications are considered part of and are hereby expressly incorporated by reference into this Patent Application.

TECHNICAL FIELD

Aspects of the present disclosure generally relate to wireless communication and to techniques for a high priority route selection descriptor selection timer.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The "downlink" (or forward link) refers to the communication link from the BS to the UE, and the "uplink" (or reverse link) refers to the communication link from the UE to the BS. As will be described in more detail herein, a BS may be referred to as a Node B, an LTE evolved nodeB (eNB), a gNB, an access point (AP), a radio head, a transmit receive point (TRP), a New Radio (NR) BS, a 5G NodeB, or the like.

Multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL) (or a combination thereof), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equipment (UE). The method may include transmitting a first protocol data unit (PDU) session establishment request message to establish a first PDU session for an application associated with the UE. The method may include receiving a PDU session establishment accept message for the first PDU session based on the PDU session establishment request message. The method may include initiating a route selection descriptor (RSD) selection timer based on a first RSD priority associated with the first PDU session establishment request message being lower than a second RSD priority for the application. The method may include transmitting, after expiration of at least one of the RSD selection timer or a periodic re-evaluation timer, a second PDU session establishment request message to establish a second PDU session for the application. The second PDU session establishment request message may be associated with the second RSD priority.

In some aspects, the second RSD priority for the application is a highest RSD priority indicated in a UE route selection policy for the application. In some aspects, transmitting the second PDU session establishment request message to establish the second PDU session for the application includes transmitting the second PDU session establishment request message to establish the second PDU session while being connected to the first PDU session. In some aspects, the method further includes receiving a PDU session establishment accept message for the second PDU session based on the second PDU session establishment request message and releasing the first PDU session based on receiving the PDU session establishment accept message for the second PDU session.

In some aspects, the method further includes receiving a PDU session establishment reject message for the second PDU session based on the PDU session establishment request message, transmitting a third PDU session establishment request message to establish the second PDU session for the application, receiving a PDU session establishment accept message for the second PDU session based on the third PDU session establishment request message, and reinitiating the RSD selection timer based on a third RSD priority associated with the third PDU session establishment request message being lower than the second RSD priority for the application. In some aspects, a time duration of the RSD selection timer is greater than two minutes and less than a time duration of the periodic re-evaluation timer.

In some aspects, transmitting the second PDU session establishment request includes transmitting the second PDU session establishment request based on expiration of at least one of the RSD selection timer or a periodic re-evaluation timer. In some implementations, transmitting the second PDU session establishment request includes automatically transmitting the second PDU session establishment request based on expiration of at least one of the RSD selection timer or a periodic re-evaluation timer. In some aspects, transmitting the second PDU session establishment request includes transmitting the second PDU session establishment request based on receiving, via a user interface (UI) of the UE, input from a user indicating approval to transmit the second PDU session establishment request. In some aspects, the method includes displaying, after expiration of at least one of the RSD selection timer or a periodic re-evaluation timer, a request for approval to transmit the second PDU session establishment request, the request being displayed via the UI of the UE. In some aspects, receiving the input from the user indicating approval includes receiving the input from the user indicating approval based on displaying the request for approval. In some aspects a duration of the RSD selection timer duration is signaled to the UE by a network component. In some aspects, a duration of the RSD selection timer is based on user input received via the UI or based on a configuration of the UE.

Another innovative aspect of the subject matter described in this disclosure can be implemented in an apparatus of a UE for wireless communication. The apparatus of the UE may include a first interface to output a first signal for transmitting a first PDU session establishment request message to establish a first PDU session for an application associated with the UE. The apparatus of the UE may include the first interface or a second interface to obtain a PDU session establishment accept message for the first PDU session based on the PDU session establishment request message. The apparatus of the UE may include a processing system to initiate an RSD selection timer based on a first RSD priority associated with the first PDU session establishment request message being lower than a second RSD priority for the application. The apparatus of the UE may include the first interface to output a second signal for transmitting, after expiration of at least one of the RSD selection timer or a periodic re-evaluation timer, a second PDU session establishment request message to establish a second PDU session for the application. The second PDU session establishment request message may be associated with the second RSD priority. In some aspects, the apparatus of the UE may perform or implement any one or more of the aspects described in connection with the method above or elsewhere herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to transmit a first PDU session establishment request message to establish a first PDU session for an application associated with the UE. The one or more instructions, when executed by one or more processors of a UE, may cause the one or more processors to receive a PDU session establishment accept message for the first PDU session based on the PDU session establishment request message. The one or more instructions, when executed by one or more processors of a UE, may cause the one or more processors to initiate an RSD selection timer based on a first RSD priority associated with the first PDU session establishment request message being lower than a second RSD priority for the application. The one or more instructions, when executed by one or more processors of a UE, may cause the one or more processors to transmit, after expiration of at least one of the RSD selection timer or a periodic re-evaluation timer, a second PDU session establishment request message to establish a second PDU session for the application. The second PDU session establishment request message may be associated with the second RSD priority. In some aspects, the one or more instructions, when executed by one or more processors of the UE, may cause the one or more processors to perform or implement any one or more of the aspects described in connection with the method above or elsewhere herein.

Another innovative aspect of the subject matter described in this disclosure can be implemented in an apparatus for wireless communication. The apparatus may include means for means for transmitting a first PDU session establishment request message to establish a first PDU session for an application associated with the UE. The apparatus may include means for receiving a PDU session establishment accept message for the first PDU session based on the PDU session establishment request message. The apparatus may include means for initiating an RSD selection timer based on a first RSD priority associated with the first PDU session establishment request message being lower than a second RSD priority for the application. The apparatus may include means for transmitting, after expiration of at least one of the RSD selection timer or a periodic re-evaluation timer, a second PDU session establishment request message to establish a second PDU session for the application. The second PDU session establishment request message is associated with the second RSD priority. In some aspects, the apparatus may perform or implement any one or more of the aspects described in connection with the method above or elsewhere herein.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 3 is a diagram illustrating an example of a high priority route selection descriptor (RSD) selection timer.

FIG. 4 is a diagram illustrating an example process performed, for example, by a UE.

FIG. 5 is a diagram illustrating another example of a high priority RSD selection timer.

Like reference numbers and designations in the various drawings indicate like elements.

DETAILED DESCRIPTION

Figure 1:
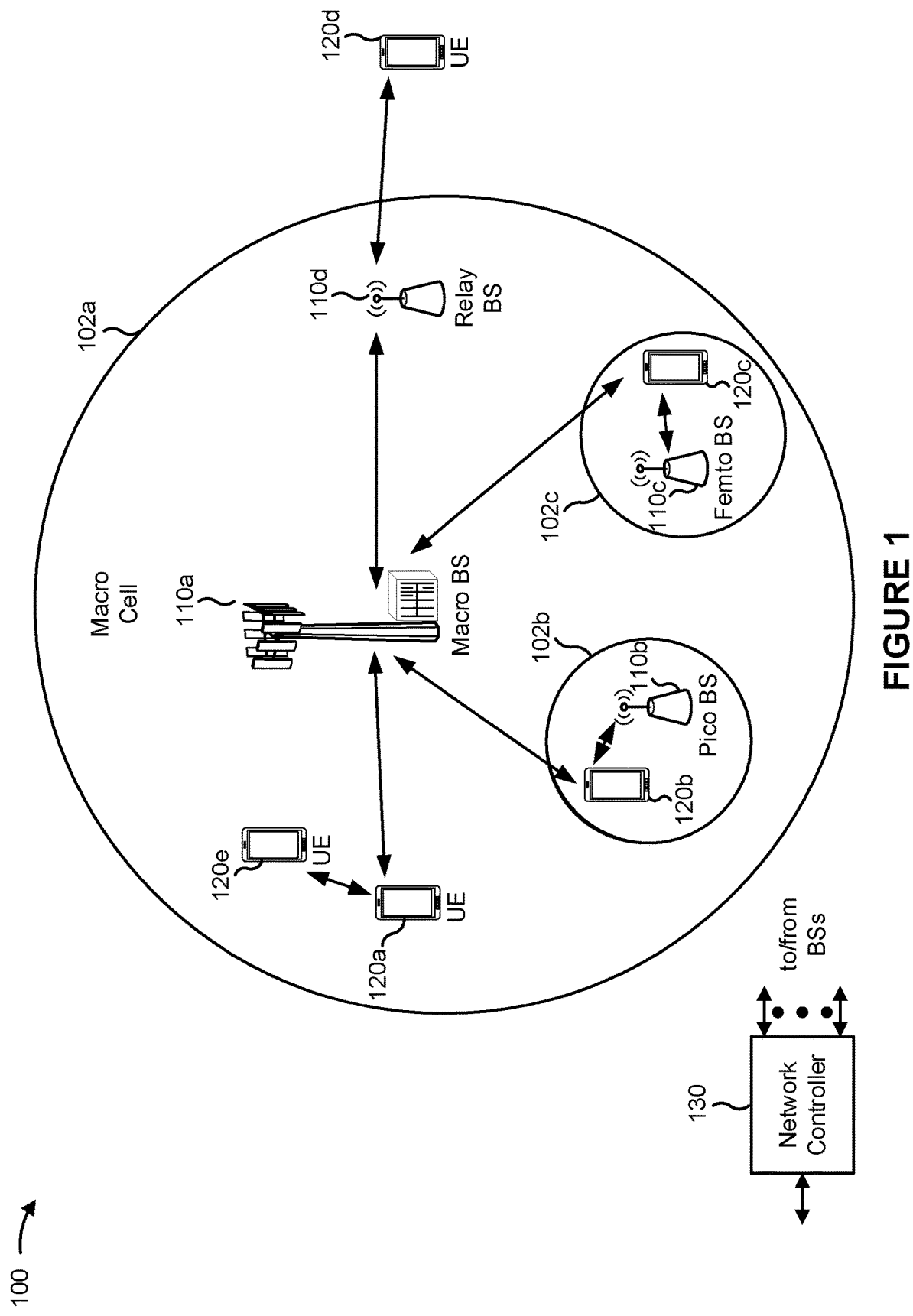
FIG. 1 is a block diagram illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A user equipment (UE) may configure a protocol data unit (PDU) session establishment parameter according the content of a selected route selection descriptor (RSD) for an application associated with the UE. The application may be a software application client installed on the UE or a cloud-based application accessed by the UE, such as a video application, a messaging application, a productivity application, a gaming application, a map or positioning application, or another type of application. Additionally, the application may be a software application or industrial application installed on an Internet of Things (IoT) device or a cloud-based application accessed by the IoT device or industrial IoT (IIoT) device, such as an automation application, an augmented reality (AR) or virtual reality (VR) application, an infrastructure application, a robotics-related application, a maintenance application, a security application, or another type of application. An RSD may have various components, such as a session service and continuity (SSC) mode, a network slice selection, a data network name (DNN), a PDU session type, or access type, among other examples.

The UE (or an application of the UE) may request a connection to a network slicing instance of a core network (such as a 5G core network) by transmitting a PDU session request to the core network (for example, a network controller of the core network implementing an access and mobility management (AMF) function). During a PDU session setup procedure, the UE may use an RSD (and the RSD components associated with the RSD) to set up a PDU session and to connect to a network slicing instance.

If the core network (for example, the network controller of the core network implementing the AMF function) rejects the PDU session establishment request (for example, for insufficient resources for a specific slice, for an unsupported SSC mode, or for insufficient resources for a specific slice and a DNN, among other examples), the PDU session is not established. The UE may retry the PDU session establishment request until the core network (for example, the network controller of the core network implementing the AMF function) accepts the request.

For each PDU session establishment request, the UE may try a different RSD according to a priority order. The core network (for example, the network controller of the core network implementing the AMF function) may reject a PDU session establishment request having a high RSD priority for load balancing purposes or for other reasons. The UE may first transmit a PDU session establishment request with a highest RSD priority for the application (for example, as indicated in a UE route selection policy (URSP) for the application) and may continue with subsequent PDU session establishment requests in a descending RSD priority. If a PDU session establishment request having an RSD priority that is lower than the highest RSD priority for the application is accepted, the PDU session is established and the UE is given no opportunity to request PDU session establishment with a higher RSD priority. The PDU session with the lower RSD priority may result in poor user experience for the application, reduced data rates and reliability for the application, or increased latency for the application, among other examples.

Some aspects described herein provide techniques and apparatuses for a high priority route selection descriptor selection timer. A PDU session may be established for an application associated with a UE. If the PDU session is associated with a lower RSD priority than the highest RSD priority for the application, the UE may initiate an RSD selection timer. After expiration of the RSD selection timer, the UE may try to establish another PDU session for the application with the highest RSD priority for the application. If another PDU session with the highest RSD priority is accepted, the UE may release the initial PDU session with the lower RSD priority and establish a new PDU session with the highest RSD priority.

Particular implementations of the subject matter described in this disclosure can be implemented to realize one or more of the following potential advantages. The RSD selection timer may enable the UE to attempt to obtain a PDU session with a highest RSD priority for an application associated with the UE even after a PDU session was established with a lower RSD priority. This may increase the user experience of the application, may increase data rates and reliability for the application, may decrease latency of the application, may increase quality of service (QoS) for the application, or may decrease power consumption, among other examples. Moreover, the duration of the RSD selection timer may be shorter than a duration of a periodic re-evaluation timer, which enables the UE to attempt to obtain a PDU session with a highest RSD priority for the application more quickly than if the UE solely relies on the periodic re-evaluation timer.

FIG. 1 is a block diagram illustrating an example of a wireless network 100. The wireless network 100 may be an LTE network or some other wireless network, such as a 5G or NR network. Wireless network 100 may include a number of BSs 110 (shown as BS 110a, BS 110b, BS 110c, and BS 110d) and other network entities. ABS is an entity that communicates with UEs and also may be referred to as a base station, a NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110a and a UE 120d in order to facilitate communication between BS 110a and UE 120d. A relay BS also may be referred to as a relay station, a relay base station, a relay, etc.

Wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time— frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using P2P communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, or mid-band frequencies (for example, greater than 7.125 GHz). Similarly, unless specifically stated otherwise, it should be understood that the term "millimeter wave" or the like, if used herein, may broadly represent frequencies within the EHF band, frequencies within FR2, or mid-band frequencies (for example, less than 24.25 GHz). It is contemplated that the frequencies included in FR1 and FR2 may be modified, and techniques described herein are applicable to those modified frequency ranges.

Figure 2:
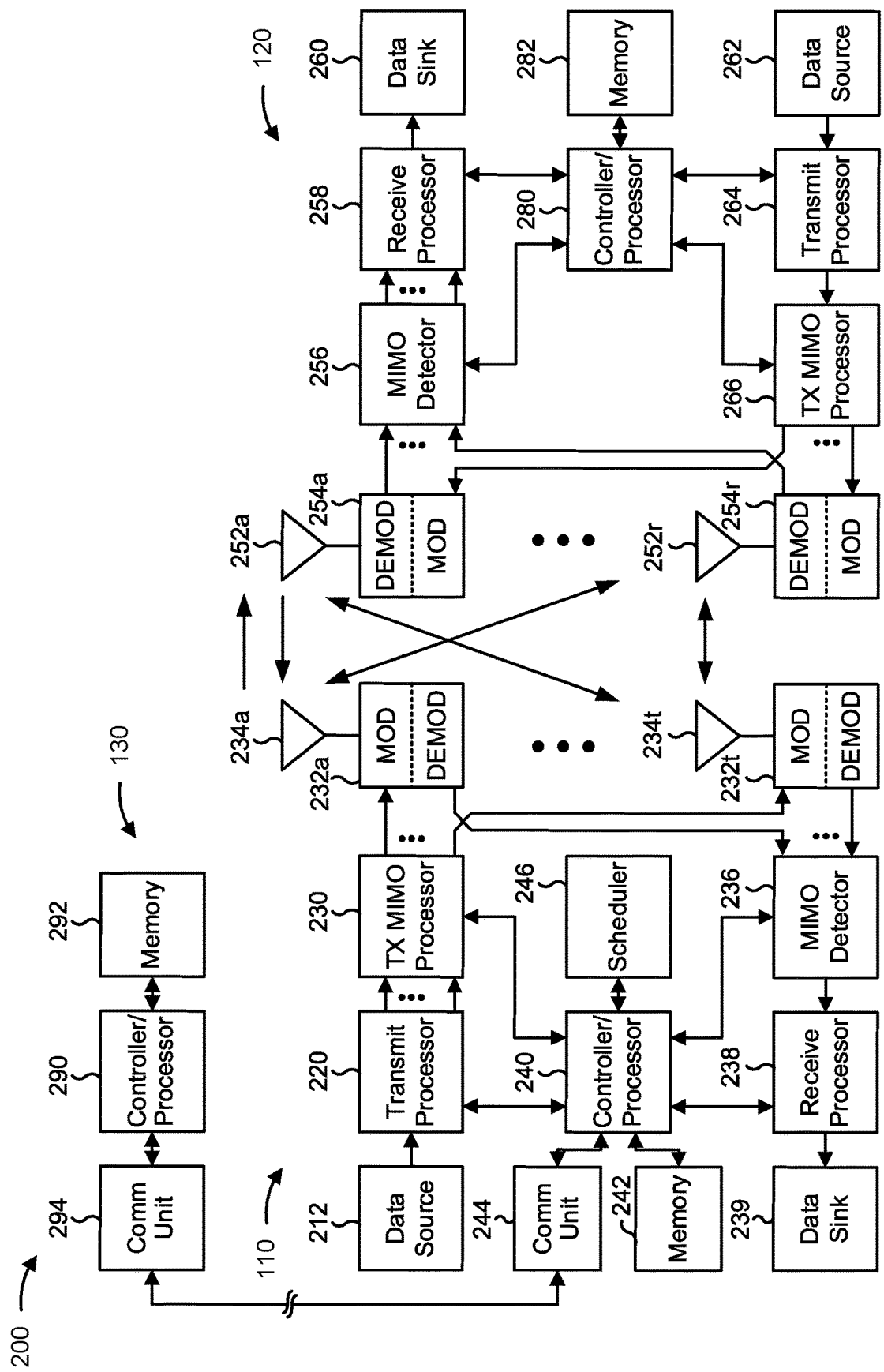
FIG. 2 is a block diagram illustrating an example of a base station (BS) in communication with a user equipment (UE) in a wireless network.

FIG. 2 is a block diagram illustrating an example 200 of a base station 110 in communication with a UE 120. In some aspects, base station 110 and UE 120 may respectively be one of the base stations and one of the UEs in wireless network 100 of FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232*a* through 232*t*. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 or other base stations and may provide received signals to demodulators (DE-MODs) 254*a* through 254*r*, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), CQI, etc. In some aspects, one or more components of UE 120 may be included in a housing.

Antennas (such as antennas 234*a* through 234*t* and/or antennas 252*a* through 252*r*) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing and/or antenna elements within multiple housings. An antenna panel, an antenna group, a set of antenna elements, or an antenna array may include one or more antenna elements coupled to one or more transmission and/or reception components, such as one or more components of FIG. 2.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by modulators 254*a* through 254*r* (for example, for DFT-s-OFDM or CP-OFDM), and transmitted to base station 110. In some aspects, a modulator and a demodulator (such as MOD/DEMOD 254) of the UE 120 may be included in a modem of the UE 120. In some aspects, the UE 120 includes a transceiver. The transceiver may include any combination of antenna(s) 252, modulators or demodulators 254, MIMO detector 256, receive processor 258, transmit processor 264, or TX MIMO processor 266. The transceiver may be used by a processor (such as the controller/processor 280) and memory 282 to perform aspects of any of the methods described herein (for example, as described with reference to FIGS. 3-5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The base station 110 may include communication unit 244 and communicate to network controller 130 via communication unit 244. Base station 110 may include a scheduler 246 to schedule UEs 120 for downlink and/or uplink communications. In some aspects, a modulator and a demodulator (such a MOD/DEMOD 232) of the base station 110 may be included in a modem of the base station 110. In some aspects, the base station 110 includes a transceiver. The transceiver may include any combination of antenna(s) 234, modulators or demodulators 232, MIMO detector 236, receive processor 238, transmit processor 220, or TX MIMO processor 230. The transceiver may be used by a processor (such as controller/processor 240) and memory 242 to perform aspects of any of the methods described herein (for example, as described with reference to FIGS. 3-5). The network controller 130 may include communication unit 294, a controller or processor (i.e., controller/processor) 290, and memory 292.

In some implementations, controller/processor 280 may be a component of a processing system. A processing system may generally refer to a system or series of machines or components that receives inputs and processes the inputs to produce a set of outputs (which may be passed to other systems or components of, for example, the UE 120). For example, a processing system of the UE 120 may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface to receive or obtain information, and a second interface to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, controller/processor 240 may be a component of a processing system. A processing system may generally refer to a system or series of machines or components that receives inputs and processes the inputs to produce a set of outputs (which may be passed to other systems or components of, for example, the BS 110). For example, a processing system of the BS 110 may refer to a system including the various other components or subcomponents of the BS 110.

The processing system of the BS 110 may interface with other components of the BS 110, and may process information received from other components (such as inputs or signals), output information to other components, etc. For example, a chip or modem of the BS 110 may include a processing system, a first interface to receive or obtain information, and a second interface to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

The controller/processor 240 of base station 110, the controller/processor 280 of UE 120, or any other component(s) of FIG. 2 may perform one or more techniques associated with a high priority route selection descriptor selection timer, as described in more detail elsewhere herein. For example, the controller/processor 240 of base station 110, the controller/processor 280 of UE 120, or any other component(s) (or combinations of components) of FIG. 2 may perform or direct operations of, for example, process 400 of FIG. 4 or other processes as described herein. The memories 242 and 282 may store data and program codes for base station 110 and UE 120, respectively. A scheduler 246 may schedule UEs for data transmission on the downlink, the uplink, or a combination thereof.

The stored program codes, when executed by the controller/processor 280 or other processors and modules at UE 120, may cause the UE 120 to perform operations described with respect to process 400 of FIG. 4 or other processes as described herein. A scheduler 246 may schedule UEs for data transmission on the downlink, the uplink, or a combination thereof.

In some aspects, UE 120 may include means for means for transmitting a PDU session establishment request message to establish a first PDU session for an application associated with the UE, means for receiving a PDU session establishment accept message for the first PDU session based on the PDU session establishment request message, means for initiating a RSD selection timer based on a first RSD priority associated with the first PDU session establishment request message being lower than a second RSD priority for the application, means for transmitting, after expiration of at least one of the RSD selection timer or a periodic re-evaluation timer, a second PDU session establishment request message to establish a second PDU session for the application, where the second PDU session establishment request message is associated with the second RSD priority, or the like, or combinations thereof. In some aspects, such means may include one or more components of UE 120 described in connection with FIG. 2.

While blocks in FIG. 2 are illustrated as distinct components, the functions described herein with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

FIG. 3 is a diagram illustrating an example 300 of a high priority RSD selection timer. As shown in FIG. 3, example 300 includes communication between a UE (a UE 120) and a plurality of network components (network controllers 130) such as an AMF, and UPF1-UPF3. The UE and the network components may communicate via a base station (base station 110). The UE and the base station may be included in a wireless network such as wireless network 100 described herein.

As shown in FIG. 3, a UE may transmit multiple PDU session establishment requests to a network controller implementing an AMF function in a core network, such as a 5G core network. The PDU session establishment requests may be associated with an application of the UE. If the PDU session establishment request associated with the highest RSD priority for the application is rejected, the UE may accept a PDU session having a lower RSD priority and may initiate an RSD selection timer. After expiration of at least one of the RSD selection timer or a periodic re-evaluation timer, the UE may transmit another PDU session establishment request to attempt to establish another PDU session having the highest RSD priority for the application. If the PDU session establishment request is rejected, the UE may restart or reinitiate the RSD selection timer and may continue to transmit PDU session establishment requests for the highest RSD priority accordingly. If a PDU session establishment request for the highest RSD priority is accepted, the UE may establish the PDU session and release the PDU session having the lower RSD priority.

The UE may be communicatively connected and registered with a RAN of the wireless network. In some aspects, the UE may perform a random access channel (RACH) procedure to register with the RAN, for example, via a base station of the RAN. The RAN may include a 5G NG-RAN or another type of RAN. The RAN may include a distributed or disaggregated RAN (D-RAN) configuration, an open RAN (O-RAN) configuration, or another type of RAN configuration.

The RAN may include a 5G access node, which includes an access node controller (ANC). The access node controller may be a centralized unit (CU) of a distributed or disaggregated RAN. In some aspects, a backhaul interface to a 5G core network may terminate at the access node controller. The 5G core network may include a 5G control plane component (the AMF component or the network controller implementing the AMF function) and a plurality of 5G user plane components (the UPF components or the network controllers implementing the UPF components). The backhaul interface for one or both of the 5G control plane and the 5G user plane may terminate at the access node controller. Additionally, or alternatively, a backhaul interface to one or more neighbor access nodes (e.g., another 5G access node and/or an LTE access node) may terminate at the access node controller.

The access node controller may include and may communicate with one or more transmit receive points (TRPs— also referred to as distributed or disaggregated units (DUs)) via an F1 Control (F1-C) interface, an F1 User (F1-U) interface, or another type of interface. In some aspects, a DU may correspond to a base station described herein. For example, different DUs may be included in different base stations. Additionally, or alternatively, multiple DUs may be included in a single base station. In some aspects, a base station may include a CU or ANC, may one or more DUs, or a combination thereof.

A DU may be connected to a single access node controller or to multiple access node controllers. In some aspects, a dynamic configuration of split logical functions may be present within the architecture of a distributed or disaggregated RAN. For example, a packet data convergence protocol (PDCP) layer, a radio link control (RLC) layer, and/or a medium access control (MAC) layer may be configured to terminate at the access node controller or at a DU.

At 302, an application executing, running, or operating on the UE may generate a request for a network connection such as a PDU session. The application may be a software application client installed on the UE or a cloud-based application accessed by the UE, such as a video application, a messaging application, a productivity application, a gaming application, a map or positioning application, or another type of application. Additionally, the application may be a software application or industrial application installed on an IoT device or a cloud-based application accessed by the IoT device or IIoT device, such as an automation application, an AR or VR application, an infrastructure application, a robotics-related application, a maintenance application, a security application, or another type of application.

At 304, the modem may obtain the request for the network connection from the application and may generate a PDU session establishment request. In some aspects, the modem of the UE generates the PDU session establishment request based on the request for the network connection. The UE may use the PDU session establishment request to request a connection to a network slicing instance of a core network (such as a 5G core network) by transmitting (or the modem of the UE may output for transmission) a PDU session establishment request to the core network (for example, the AMF) via the base station of the wireless network. During a PDU session setup procedure, the UE may use an RSD (and the RSD components associated with the RSD) to set up a PDU session and to connect to a network slicing instance of the core network.

In some aspects, the UE may attempt to request the best RSD for the network connection for the application. This may be referred to as the highest priority RSD for the application. Which RSD is the "best RSD" for the application may depend on the type of application, the type of traffic that is to be transferred by the application and the network, quality of service (QoS) parameters for the application, a combination thereof, or other parameters. As an example, the highest priority RSD for an application that prioritizes low latency (such as a gaming application or a video calling application) may be an RSD that provides the lowest latency for the UE. As another example, the highest priority RSD for an application that prioritizes throughput (such as a video streaming application or a large file downloading application) may be an RSD that provides the highest throughput for the UE.

At 306, the AMF provides a UPF selection request to the UPF associated with the RSD indicated in the PDU session establishment request (UPF1 and RSD #1, respectively, in this example). The UPF receives the UPF selection request and determines whether the UPF can support the network connection with the UE for the application on the network slice associated with the UPF. Examples of parameters or criteria that the UPF may base the determination on include the quantity or number of connections that the UPF is providing or servicing (for example, at the time that the UPF receives the UPF selection request), the available bandwidth at the UPF (for example, for the requested network slice associated with the RSD, the DNN associated with the RSD, or a combination thereof), whether the UPF supports the SSC associated with the RSD, whether the UPF can support the throughput parameters for the application of the UE (which may be indicated in the UPF selection request), and whether the UPF can support the latency parameters for the application of the UE (which may be indicated in the UPF selection request), among other examples. However, the UPF may consider other parameters and criteria in addition to, or alternatively to, the parameters and criteria described herein.

At 308, the AMF transmits a PDU session establishment rejection communication to the UE. The UE may receive (or the modem of the UE may obtain) the PDU session establishment rejection communication from the AMF (for example, via a base station in the wireless network). The PDU session establishment rejection communication may be based on the AMF receiving an indication that the UPF has rejected the specific RSD requested by the UE. The PDU session establishment rejection communication may indicate the PDU session establishment request is rejected and may provide a reason for the rejection. For example, the PDU session establishment rejection communication may indicate that the PDU session establishment request is rejected for insufficient resources for the specific network slice associated with the requested RSD, for an unsupported SSC mode, or for insufficient resources for the specific network slice associated with the requested RSD and a DNN, among other examples.

At 310, the UE (or the modem of the UE) may generate a second PDU session establishment request. In some aspects, the modem of the UE generates the second PDU session establishment request based on receiving the PDU session establishment rejection communication from the AMF. The UE may transmit (or the modem of the UE may output for transmission) the second PDU session establishment request to request a connection to a network slicing instance of the core network associated with a second RSD (RSD #2). This gives the UE the opportunity to still attempt to establish the network connection for the application of the UE with a lower priority RSD. The second RSD may be a second highest priority for the application.

At 312, the AMF provides a UPF selection request to the UPF associated with the RSD indicated in the second PDU session establishment request (UPF2 and RSD #2, respectively, in this example). The UPF receives the UPF selection message and determines whether the UPF can support the network connection with the UE for the application on the network slice associated with the UPF. Examples of parameters or criteria that the UPF may base the determination on include the quantity or number of connections that the UPF is providing or servicing (for example, at the time that the UPF receives the UPF selection request), the available bandwidth at the UPF (for example, for the requested network slice associated with the RSD, the DNN associated with the RSD, or a combination thereof), whether the UPF supports the SSC associated with the RSD, whether the UPF can support the throughput parameters for the application of the UE (which may be indicated in the UPF selection request), and whether the UPF can support the latency parameters for the application of the UE (which may be indicated in the UPF selection request), among other examples. However, the UPF may consider other parameters and criteria in addition to, or alternatively to, the parameters and criteria described herein.

At 314, the AMF transmits a PDU session establishment rejection communication to the UE. The UE may receive (or the modem of the UE may obtain) the PDU session establishment rejection communication from the AMF (for example, via a base station in the wireless network). The PDU session establishment rejection communication may be based on the AMF receiving an indication that the UPF has rejected the specific RSD requested by the UE (RSD #2). The PDU session establishment rejection communication may indicate the second PDU session establishment request is rejected and may provide a reason for the rejection. For example, the PDU session establishment rejection communication may indicate that the second PDU session establishment request is rejected for insufficient resources for the specific network slice associated with the requested RSD (RSD #2), for an unsupported SSC mode, or for insufficient resources for the specific network slice associated with the requested RSD and a DNN, among other examples.

At 316, the UE (or the modem of the UE) may generate a third PDU session establishment request. In some aspects, the modem of the UE generates the third PDU session establishment request based on receiving the PDU session establishment rejection communication from the AMF for the second PDU session establishment request. The UE may transmit (or the modem of the UE may output for transmission) the third PDU session establishment request to request a connection to a network slicing instance of the core network associated with a third RSD (RSD #3). This gives the UE the opportunity to still attempt to establish the network connection for the application of the UE with a lower priority RSD. The second RSD may be a third highest priority for the application.

At 318, the AMF provides a UPF selection request to the UPF associated with the RSD indicated in the third PDU session establishment request (UPF3 and RSD #3, respectively, in this example). The UPF receives the UPF selection message and determines whether the UPF can support the network connection with the UE for the application on the network slice associated with the UPF. Examples of parameters or criteria that the UPF may base the determination on include the quantity or number of connections that the UPF is providing or servicing (for example, at the time that the UPF receives the UPF selection request), the available bandwidth at the UPF (for example, for the requested network slice associated with the RSD, the DNN associated with the RSD, or a combination thereof), whether the UPF supports the SSC associated with the RSD, whether the UPF can support the throughput parameters for the application of the UE (which may be indicated in the UPF selection request), and whether the UPF can support the latency parameters for the application of the UE (which may be indicated in the UPF selection request), among other examples. However, the UPF may consider other parameters and criteria in addition to, or alternatively to, the parameters and criteria described herein.

At 320, the AMF transmits a PDU session establishment acceptance communication to the UE. The UE may receive (or the modem of the UE may obtain) the PDU session establishment acceptance communication from the AMF (for example, via a base station in the wireless network). The PDU session establishment acceptance communication indicates that the third PDU session establishment request with the third RSD (RSD #3) is accepted. The UE may establish the network connection (the PDU session) for the application using the network slice associated with the third RSD (RSD #3).

It is noted that the quantity of the proceeding sequence of PDU session establishment requests is an example and other quantities are within the scope of the present disclosure. The UE may continue to try RSDs to establish the network connection with the core network in descending priority order of the RSDs until a PDU session establishment request is accepted by the core network. The priority order of RSDs for a particular application may be indicated in a UE route selection policy for the application, which may be stored by the UE.

At 322, the UE (or the modem of the UE) initiates or starts an RSD selection timer (RSDSelectionTimer). In some aspects, the UE initiates the RSD selection timer based on the RSD, that was used to establish the network connection (the PDU session) with the core network (UPF3), being a lower priority than the highest priority RSD for the application. In other words, the UE may initiate the RSD selection timer based on determining that the priority of the RSD, that was used to establish the network connection (the PDU session) with the core network (UPF3), is lower than the highest priority RSD for the application. The network connection (or PDU session) with the lower RSD priority may result in poor user experience for the application, reduced data rates and reliability for the application, or increased latency for the application, among other examples.

The UE may further initiate the RSD selection timer based on signaling from the network. For example, the AMF (or a base station) may transmit a communication that configures the RSD selection timer for the UE (in other words, that indicates that the UE is to initiate the RSD selection timer if the highest priority RSD for an application is not obtained).

The RSD selection timer includes a timer at the expiration of which permits the UE to attempt to reselect a higher priority RSD for the application associated with the UE. The RSD selection timer may enable the UE to attempt to obtain a PDU session with a highest RSD priority for the application associated with the UE even after the PDU session was established with the lower priority RSD. This may increase the user experience of the application, may increase data rates and reliability for the application, may decrease latency of the application, may increase QoS for the application, or may decrease power consumption, among other examples. The UE may also initiate a periodic re-evaluation timer. The duration of the RSD selection timer may be shorter than a duration of the periodic re-evaluation timer, which enables the UE to attempt to obtain a PDU session with a highest RSD priority for the application more quickly than if the UE solely relies on the periodic re-evaluation timer. In some aspects, the duration of the RSD selection timer is greater than two minutes and less than the time duration of the periodic re-evaluation timer. In some aspects, the duration of the RSD selection timer is another duration. In some aspects, the duration of the periodic re-evaluation timer is five minutes, ten minutes, or is configured based on UE implementation.

In some aspects, the duration of the RSD selection timer is signaled to the UE by a component of the wireless network such as a base station. The AMF may provide an indication of the duration of the RSD selection timer to the base station, which transmits the indication of the duration to the UE. The base station may transmit the indication of the duration of the RSD selection timer at the time that the UE connects to the wireless network, at the time that the network connection (the PDU session) for the application is established, or at another time.

In some aspects, the duration of the RSD selection timer is based on input to the UE. For example, the UE may provide a user interface (UI) that is accessed by a user of the UE via a display of the UE. The user may provide input to the UE via the UI. The input may indicate a selection of the duration for the RSD selection timer. The user may select an initial duration and may change the duration of the RSD selection time via the UI. In some aspects, the duration of the RSD selection timer is based on a configuration of the UE, which may be installed on the UE at (or prior to) the time that the UE is provisioned and deployed into the wireless network.

At 324, the UE may determine whether the RSD selection timer (RSDSelectionTimer) has expired. At 326, the UE may determine whether the periodic re-evaluation timer has expired. If the UE determines that neither of the RSD selection timer or the periodic re-evaluation timer have expired, the UE may continue to wait or monitor the RSD selection timer and the periodic re-evaluation timer have for expiration.

The UE may determine whether the RSD selection timer has expired based on monitoring a count-down (or a count-up) of the RSD selection timer. For example, the UE may initiate the RSD selection timer to a duration of three minutes, and may count down the three minutes until the RSD selection timer reaches zero. The UE may determine that the RSD selection timer has expired based on determining that the RSD selection timer has reached zero. As another example, the UE may initiate the RSD selection timer to zero, and may count up from zero until the RSD selection timer reaches a threshold timer duration (for example, four minutes). The UE may determine that the RSD selection timer has expired based on determining that the RSD selection timer has reached four minutes.

Similarly, the UE may determine whether the periodic re-selection timer has expired based on monitoring a count-down (or a count-up) of the periodic re-selection timer. For example, the UE may initiate the periodic re-selection timer to a duration of fifteen minutes, and may count down the fifteen minutes until the periodic re-selection timer reaches zero. The UE may determine that the periodic re-selection timer has expired based on determining that the periodic re-selection timer has reached zero. As another example, the UE may initiate the periodic re-selection timer to zero, and may count up until the periodic re-selection timer reaches a threshold timer duration (for example, eight minutes). The UE may determine that the periodic re-selection timer has expired based on determining that the periodic re-selection timer has reached eight minutes.

At 328, after expiration of at least one of the RSD selection timer or the periodic re-evaluation timer, the UE may transmit (or the modem of the UE may output for transmission) a PDU session establishment request for the application. The PDU session establishment request is associated with the highest priority RSD associated with the application. This gives the UE another opportunity to try and obtain the highest priority RSD after expiration of at least one of the RSD selection timer or the periodic re-evaluation timer.

The UE may transmit the PDU session establishment request after expiration of at least one of the RSD selection timer or the periodic re-evaluation timer based on the network configuring the UE to retry the highest priority RSD in aspects where the highest priority RSD was previously rejected for a PDU session of an application of the UE. The UE may transmit the PDU session establishment request to establish a second network connection (a PDU session) for the application. The UE may maintain the established network connection (the established PDU session) for the application while attempting to establish the second network connection for the application so as to maintain service for the application and to not interrupt the user experience of the application.

At 330, the AMF provides a UPF selection request to the UPF associated with the RSD indicated in the PDU session establishment request (UPF1 and RSD #1, respectively, in this example). The UPF receives the UPF selection message and determines whether the UPF can support the network connection with the UE for the application on the network slice associated with the UPF. Examples of parameters or criteria that the UPF may base the determination on include the quantity or number of connections that the UPF is providing or servicing (for example, at the time that the UPF receives the UPF selection request), the available bandwidth at the UPF (for example, for the requested network slice associated with the RSD, the DNN associated with the RSD, or a combination thereof), whether the UPF supports the SSC associated with the RSD, whether the UPF can support the throughput parameters for the application of the UE (which may be indicated in the UPF selection request), and whether the UPF can support the latency parameters for the application of the UE (which may be indicated in the UPF selection request), among other examples. However, the UPF may consider other parameters and criteria in addition to, or alternatively to, the parameters and criteria described herein.

At 332, the AMF transmits a PDU session establishment acceptance communication to the UE. The PDU session establishment acceptance communication indicates that the PDU session establishment request with the highest priority RSD (RSD #1) is accepted. The UE may establish the network connection (the PDU session) for the application using the network slice associated with the highest priority RSD (RSD #1). Once the network connection (PDU session) is established, the UE may release the network connection (the PDU session) with the lower priority RSD for the application.

If instead the PDU session establishment request for the highest priority RSD is again rejected by the core network, the UE may again initiate (reinitiate) the RSD selection timer and the periodic re-evaluation timer. In these aspects, the UE may perform the operations described in connection with 322-328 to subsequently attempt to obtain the highest priority RSD for the application.

FIG. 4 is a diagram illustrating an example process 400 performed, for example, by a UE. The process 400 is an example where the UE (such as UE 120, among other examples) performs operations associated with a high priority route selection descriptor selection timer.

As shown in FIG. 4, in some aspects, the process 400 may include transmitting a first PDU session establishment request message to establish a first PDU session for an application associated with the UE (block 410). For example, the UE (such as, using receive processor 258, transmit processor 264, controller/processor 280, memory 282, or another component) may transmit a first PDU session establishment request message to establish a first PDU session for an application associated with the UE, as described herein.

As shown in FIG. 4, in some aspects, the process 400 may include receiving a PDU session establishment accept message for the first PDU session based on the PDU session establishment request message (block 420). For example, the UE (such as, using receive processor 258, transmit processor 264, controller/processor 280, memory 282, or another component) may receive a PDU session establishment accept message for the first PDU session based on the PDU session establishment request message, as described herein.

As shown in FIG. 4, in some aspects, the process 400 may include initiating an RSD selection timer based on a first RSD priority associated with the first PDU session establishment request message being lower than a second RSD priority for the application (block 430). For example, the UE (such as, using receive processor 258, transmit processor 264, controller/processor 280, memory 282, or another component) may initiate an RSD selection timer based on a first RSD priority associated with the first PDU session establishment request message being lower than a second RSD priority for the application, as described herein.

As shown in FIG. 4, in some aspects, the process 400 may include transmitting, after expiration of at least one of the RSD selection timer or a periodic re-evaluation timer, a second PDU session establishment request message to establish a second PDU session for the application, where the second PDU session establishment request message is associated with the second RSD priority (block 440). For example, the UE (for example, using receive processor 258, transmit processor 264, controller/processor 280, memory 282, or another component) may transmit, after expiration of at least one of the RSD selection timer or a periodic re-evaluation timer, a second PDU session establishment request message to establish a second PDU session for the application, as described herein. In some aspects, the second PDU session establishment request message is associated with the second RSD priority.

The process 400 may include additional aspects, such as any single aspect or any combination of aspects described below or in connection with one or more other processes described elsewhere herein.

In a first aspect, the second RSD priority for the application is a highest RSD priority indicated in a UE route selection policy for the application. In a second additional aspect, alone or in combination with the first aspect, transmitting the second PDU session establishment request message to establish the second PDU session for the application includes transmitting the second PDU session establishment request message to establish the second PDU session while being connected to the first PDU session. In a third additional aspect, alone or in combination with one or more of the first and second aspects, the process 400 includes receiving a PDU session establishment accept message for the second PDU session based on the second PDU session establishment request message; and releasing the first PDU session based on receiving the PDU session establishment accept message for the second PDU session.

In a fourth additional aspect, alone or in combination with one or more of the first through third aspects, the process 400 includes receiving a PDU session establishment reject message for the second PDU session based on the PDU session establishment request message; transmitting a third PDU session establishment request message to establish the second PDU session for the application; receiving a PDU session establishment accept message for the second PDU session based on the third PDU session establishment request message; and reinitiating the RSD selection timer based on a third RSD priority associated with the third PDU session establishment request message being lower than the second RSD priority for the application. In a fifth additional aspect, alone or in combination with one or more of the first through fourth aspects, a time duration of the RSD selection timer is greater than two minutes and less than a time duration of the periodic re-evaluation timer.

In a sixth aspect, alone or in combination with one or more of the first through fifth aspects, transmitting the second PDU session establishment request includes transmitting the second PDU session establishment request based on expiration of at least one of the RSD selection timer or a periodic re-evaluation timer. In some implementations, transmitting the second PDU session establishment request includes automatically transmitting the second PDU session establishment request based on expiration of at least one of the RSD selection timer or a periodic re-evaluation timer. In a seventh aspect, alone or in combination with one or more of the first through sixth aspects, transmitting the second PDU session establishment request includes transmitting the second PDU session establishment request based on receiving, via a user interface (UI) of the UE, input from a user indicating approval to transmit the second PDU session establishment request.

In an eighth aspect, alone or in combination with one or more of the first through seventh aspects, process 400 includes displaying, after expiration of at least one of the RSD selection timer or a periodic re-evaluation timer, a request for approval to transmit the second PDU session establishment request, the request being displayed via the UI of the UE. In a ninth aspect, alone or in combination with one or more of the first through eighth aspects, receiving the input from the user indicating approval includes receiving the input from the user indicating approval based on displaying the request for approval.

In a tenth aspect, alone or in combination with one or more of the first through ninth aspects, a duration of the RSD selection timer duration is signaled to the UE by a network component. In an eleventh aspect, alone or in combination with one or more of the first through tenth aspects, a duration of the RSD selection timer is based on user input received via the UI or based on a configuration of the UE.

Although FIG. 4 shows example blocks of the process 400, in some aspects, the process 400 may include additional blocks, fewer blocks, different blocks, or differently arranged blocks than those depicted in FIG. 4. Additionally, or alternatively, two or more of the blocks of the process 400 may be performed in parallel.

FIG. 5 is a diagram illustrating an example 500 of a high priority RSD selection timer. As shown in FIG. 5, a UE may transmit multiple PDU session establishment requests to a network controller implementing an AMF function in a core network, such as a 5G core network. The PDU session establishment requests may be associated with an application of the UE. If the PDU session establishment request associated with the highest RSD priority for the application is rejected, the UE may accept a PDU session having a lower RSD priority and may initiate an RSD selection timer.

After expiration of at least one of the RSD selection timer or a periodic re-evaluation timer, the UE may display a notification to the user of the UE on the display screen of the UE. The notification may include a request for input such as a request to approve an RSD reselection attempt to establish another PDU session having the highest RSD priority for the application. The user may provide input to the UE indicating acceptance or approval of the RSD reselection attempt, or may provide input to reject the RSD reselection attempt. The UE may receive input indicating approval or acceptance, and accordingly may transmit another PDU session establishment request to attempt to establish another PDU session having the highest RSD priority for the application. If the PDU session establishment request is rejected, the UE may restart the RSD selection timer and may continue to transmit PDU session establishment requests for the highest RSD priority accordingly. If a PDU session establishment request for the highest RSD priority is accepted, the UE may establish the PDU session and release the PDU session having the lower RSD priority.

In this way, the switch to a higher priority RSD may be decided by the user and selected by the user from the user interface (UI) of the UE. The request for approval to attempt or initiate the RSD reselection is based on a recommendation received from the modem of the UE. This causes the notification to be opened on the UI informing the user that a higher priority RSD service for the application may be available. The user may decide to accept or reject the reselection based on throughput and latency of the connected RSD priority. If the user accepts, the modem of the UE sends a new PDU session establishment request with the associated high priority RSD. If the network accepts the request, the high priority RSD is associated with the application in a new PDU session. The previous PDU session with the lower priority RSD may be released.

As shown in FIG. 5, operations may be performed associated with 502-526. The operations performed in connection with 502-526 are similar to the operations described in connection with 302-326 of FIG. 3. The UE may be communicatively connected and registered with a RAN of the wireless network. In some aspects, the UE may perform a RACH procedure to register with the RAN, for example, via a base station of the RAN. The RAN may include a 5G NG-RAN or another type of RAN. The RAN may include a D-RAN configuration, an O-RAN configuration, or another type of RAN configuration.

At 528, the UE may display, after expiration of at least one of the RSD selection timer or a periodic re-evaluation timer, a request for user input (for example, approval from the user) to transmit another PDU session establishment request to retry establishing a network connection (a PDU session) with the highest priority RSD for the application. The UE may display the request (or may cause the request to be displayed) via the UI of the UE. The request may indicate that a higher priority RSD (or a higher priority service for the application) may be available, and may request the user to approve or accept (or retry) an attempt to obtain the higher priority service for the application.

At 530, the UE may receive input from the user indicating approval to retry establishing a network connection (a PDU session) with the highest priority RSD for the application. In some aspects, the UE receives the input from the user via the UI and based on displaying the request via the UI for approval. Additionally, or alternatively, the user may use the UI to provide input to set or modify a configuration for the UE associated with RSD reselection. The configuration may indicate that the UE is to retry establishing a network connection (a PDU session) with the highest priority RSD for applications where the highest priority RSD was previously rejected. In these aspects, the UE may retry establishing a network connection (a PDU session) with the highest priority RSD for the application based on the configuration.

At 532, the UE may transmit (or the modem of the UE may output for transmission) a PDU session establishment request for the application. The PDU session establishment request is associated with the highest priority RSD associated with the application. This gives the UE another opportunity to try and obtain the highest priority RSD after expiration of at least one of the RSD selection timer or the periodic re-evaluation timer. The UE may transmit the PDU session establishment request based on the configuration or based on the input received from the user via the UI of the UE (for example, indicating approval for the retry attempt).

At 534, the AMF provides a UPF selection request to the UPF associated with the RSD indicated in the PDU session establishment request (UPF1 and RSD #1, respectively, in this example). The UPF receives the UPF selection message and determines whether the UPF can support the network connection with the UE for the application on the network slice associated with the UPF. Examples of parameters or criteria that the UPF may base the determination on include the quantity or number of connections that the UPF is providing or servicing (for example, at the time that the UPF receives the UPF selection request), the available bandwidth at the UPF (for example, for the requested network slice associated with the RSD, the DNN associated with the RSD, or a combination thereof), whether the UPF supports the SSC associated with the RSD, whether the UPF can support the throughput parameters for the application of the UE (which may be indicated in the UPF selection request), and whether the UPF can support the latency parameters for the application of the UE (which may be indicated in the UPF selection request), among other examples. However, the UPF may consider other parameters and criteria in addition to, or alternatively to, the parameters and criteria described herein.

At 536, the AMF transmits a PDU session establishment acceptance communication to the UE. The PDU session establishment acceptance communication indicates that the PDU session establishment request with the highest priority RSD (RSD #1) is accepted. The UE may establish the network connection (the PDU session) for the application using the network slice associated with the highest priority RSD (RSD #1). Once the network connection (PDU session) is established, the UE may release the network connection (the PDU session) with the lower priority RSD for the application.

If instead the PDU session establishment request for the highest priority RSD is again rejected by the core network, the UE may again initiate (reinitiate) the RSD selection timer and the periodic re-evaluation timer. In these aspects, the UE may perform the operations described in connection with 322-328 to subsequently attempt to obtain the highest priority RSD for the application.

The foregoing disclosure provides illustration and description, but is not intended to be exhaustive or to limit the aspects to the precise form disclosed. Modifications and variations may be made in light of this disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a processor is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described herein should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a user equipment (UE), comprising:
    transmitting a first protocol data unit (PDU) session establishment request message to establish a first PDU session for an application associated with the UE;
    receiving a PDU session establishment accept message for the first PDU session based on the PDU session establishment request message;
    initiating a route selection descriptor (RSD) selection timer based on a first RSD priority associated with the first PDU session establishment request message being lower than a second RSD priority for the application; and
    transmitting, after expiration of at least one of the RSD selection timer or a periodic re-evaluation timer, a second PDU session establishment request message to establish a second PDU session for the application, wherein the second PDU session establishment request message is associated with the second RSD priority.

2. The method of claim 1, wherein the second RSD priority for the application is a highest RSD priority indicated in a UE route selection policy for the application.

3. The method of claim 1, wherein transmitting the second PDU session establishment request message to establish the second PDU session for the application comprises:
    transmitting the second PDU session establishment request message to establish the second PDU session while being connected to the first PDU session.

4. The method of claim 1, further comprising:
    receiving a PDU session establishment accept message for the second PDU session based on the second PDU session establishment request message; and
    releasing the first PDU session based on receiving the PDU session establishment accept message for the second PDU session.

5. The method of claim 1, further comprising:
    receiving a PDU session establishment reject message for the second PDU session based on the PDU session establishment request message;
    transmitting a third PDU session establishment request message to establish the second PDU session for the application;
    receiving a PDU session establishment accept message for the second PDU session based on the third PDU session establishment request message; and
    reinitiating the RSD selection timer based on a third RSD priority associated with the third PDU session establishment request message being lower than the second RSD priority for the application.

6. The method of claim 1, wherein a time duration of the RSD selection timer is greater than two minutes and less than a time duration of the periodic re-evaluation timer.

7. The method of claim 1, wherein transmitting the second PDU session establishment request message comprises:
    transmitting the second PDU session establishment request based on expiration of at least one of the RSD selection timer or a periodic re-evaluation timer.

8. The method of claim 1, wherein a duration of the RSD selection timer duration is signaled to the UE by a network component.

9. The method of claim 1, wherein transmitting the second PDU session establishment request comprises:
    transmitting the second PDU session establishment request based on receiving, via a user interface (UI) of the UE, input from a user indicating approval to transmit the second PDU session establishment request.

10. The method of claim 8, wherein a duration of the RSD selection timer is based on user input received via the UI or based on a configuration of the UE.

11. The method of claim 8, further comprising:
    displaying, after expiration of at least one of the RSD selection timer or a periodic re-evaluation timer, a request for approval to transmit the second PDU session establishment request, the request being displayed via the UI of the UE.

12. The method of claim 11, wherein receiving the input from the user indicating approval comprises:

receiving the input from the user indicating approval based on displaying the request for approval.

13. An apparatus of a user equipment (UE) for wireless communication, comprising:
a first interface to output a first signal for transmitting a first protocol data unit (PDU) session establishment request message to establish a first PDU session for an application associated with the UE;
the first interface or a second interface to obtain a PDU session establishment accept message for the first PDU session based on the PDU session establishment request message;
a processing system to initiate a route selection descriptor (RSD) selection timer based on a first RSD priority associated with the first PDU session establishment request message being lower than a second RSD priority for the application; and
the first interface to output a second signal for transmitting, after expiration of at least one of the RSD selection timer or a periodic re-evaluation timer, a second PDU session establishment request message to establish a second PDU session for the application,
wherein the second PDU session establishment request message is associated with the second RSD priority.

14. The apparatus of claim 13, wherein the first interface, to output the second signal for transmitting the second PDU session establishment request, is configured to:
output the second signal transmitting the second PDU session establishment request based on expiration of at least one of the RSD selection timer or a periodic re-evaluation timer.

15. The apparatus of claim 13, wherein the first interface, to output the second signal for transmitting the second PDU session establishment request, is configured to:
output the second signal for transmitting the second PDU session establishment request based on obtaining, via a user interface (UI) of the UE, input from a user indicating approval to transmit the second PDU session establishment request.

16. The apparatus of claim 15, wherein the processing system is further configured to:
display, after expiration of at least one of the RSD selection timer or a periodic re-evaluation timer, a request for approval to transmit the second PDU session establishment request, the request being displayed via the UI of the UE.

17. The apparatus of claim 16, wherein the first interface or the second interface, to obtain the input from the user indicating approval, is configured to:
obtain the input from the user indicating approval based on displaying the request for approval.

18. The apparatus of claim 13, wherein the first interface or the second interface is further configured to:
obtain a PDU session establishment accept message for the second PDU session based on the second PDU session establishment request message; and
wherein the processing system is further configured to:
release the first PDU session based on receiving the PDU session establishment accept message for the second PDU session.

19. The apparatus of claim 13, wherein the first interface or the second interface is further configured to:
obtain a PDU session establishment reject message for the second PDU session based on the PDU session establishment request message;

wherein the first interface is further configured to:
output a third signal for transmitting a third PDU session establishment request message to establish the second PDU session for the application;
wherein the second interface is further configured to:
obtain a PDU session establishment accept message for the second PDU session based on the third PDU session establishment request message; and
wherein the processing system is further configured to:
reinitiate the RSD selection timer based on a third RSD priority associated with the third PDU session establishment request message being lower than the second RSD priority for the application.

20. A non-transitory computer-readable medium storing a set of instructions for wireless communication, the set of instructions when executed by one or more processors of a user equipment (UE), cause the UE to:
transmit a first protocol data unit (PDU) session establishment request message to establish a first PDU session for an application associated with the UE;
receive a PDU session establishment accept message for the first PDU session based on the PDU session establishment request message;
initiate a route selection descriptor (RSD) selection timer based on a first RSD priority associated with the first PDU session establishment request message being lower than a second RSD priority for the application; and
transmit, after expiration of at least one of the RSD selection timer or a periodic re-evaluation timer, a second PDU session establishment request message to establish a second PDU session for the application,
wherein the second PDU session establishment request message is associated with the second RSD priority.

21. The non-transitory computer-readable medium of claim 20, wherein the one or more instructions, that cause the one or more processors to transmit the second PDU session establishment request, cause the one or more processors to:
transmit the second PDU session establishment request based on expiration of at least one of the RSD selection timer or a periodic re-evaluation timer.

22. The non-transitory computer-readable medium of claim 20, wherein the one or more instructions, that cause the one or more processors to transmit the second PDU session establishment request, cause the one or more processors to:
transmit the second PDU session establishment request based on receiving, via a user interface (UI) of the UE, input from a user indicating approval to transmit the second PDU session establishment request.

23. The non-transitory computer-readable medium of claim 22, wherein the one or more instructions further cause the one or more processors to:
display, after expiration of at least one of the RSD selection timer or a periodic re-evaluation timer, a request for approval to transmit the second PDU session establishment request, the request being displayed via the UI of the UE.

24. The non-transitory computer-readable medium of claim 23, wherein the one or more instructions, that cause the one or more processors to receive the input from the user indicating approval, cause the one or more processors to:
receive the input from the user indicating approval based on displaying the request for approval.

25. The non-transitory computer-readable medium of claim 22, wherein the one or more instructions further cause the one or more processors to:

receive a PDU session establishment accept message for the second PDU session based on the second PDU session establishment request message; and release the first PDU session based on receiving the PDU session establishment accept message for the second PDU session.

26. An apparatus for wireless communication, comprising:

means for transmitting a first protocol data unit (PDU) session establishment request message to establish a first PDU session for an application associated with the UE;

means for receiving a PDU session establishment accept message for the first PDU session based on the PDU session establishment request message;

means for initiating a route selection descriptor (RSD) selection timer based on a first RSD priority associated with the first PDU session establishment request message being lower than a second RSD priority for the application; and means for transmitting, after expiration of at least one of the RSD selection timer or a periodic re-evaluation timer, a second PDU session establishment request message to establish a second PDU session for the application, wherein the second PDU session establishment request message is associated with the second RSD priority.

27. The apparatus of claim 26, wherein the means for transmitting the second PDU session establishment request comprises:

means for transmitting the second PDU session establishment request based on expiration of at least one of the RSD selection timer or a periodic re-evaluation timer.

28. The apparatus of claim 26, wherein the means for transmitting the second PDU session establishment request comprises:

means for transmitting the second PDU session establishment request based on receiving, via a user interface (UI) of the apparatus, input from a user indicating approval to transmit the second PDU session establishment request.

29. The apparatus of claim 28, further comprising:

means for displaying, after expiration of at least one of the RSD selection timer or a periodic re-evaluation timer, a request for approval to transmit the second PDU session establishment request, the request being displayed via the UI of the apparatus.

30. The apparatus of claim 28, further comprising:

means for receiving a PDU session establishment accept message for the second PDU session based on the second PDU session establishment request message; and means for releasing the first PDU session based on receiving the PDU session establishment accept message for the second PDU session.

* * * * *